US009550542B2

(12) United States Patent
Figueroa et al.

(10) Patent No.: US 9,550,542 B2
(45) Date of Patent: Jan. 24, 2017

(54) ELECTRIC CYCLE

(71) Applicant: Ford Global Technologies, LLC, Dearborn, MI (US)

(72) Inventors: Benjamin Dueñas Figueroa, Mexico City (MX); Luis Alfonso Domínguez Victorio, Hamburg (DE); Haydee Guadalupe Martinez Rivera, Estado de Mexico (MX); Raciel Cruz Ramirez, Estado de Mexico (MX); Ramón Jáuregui Ortiz, Queretaro (MX); José Guillermo Saavedra Roman, Dearborn, MI (US); Ana Laura Quintanar Meléndez, Mexico City (MX); Daniel Amaury Menchaca Gonzalez, Mexico City (MX); José de Jesús Martinez Colin, Estado de Mexico (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/689,435

(22) Filed: Apr. 17, 2015

(65) Prior Publication Data

US 2016/0304150 A1    Oct. 20, 2016

(51) Int. Cl.
*B60K 1/00* (2006.01)
*B62K 15/00* (2006.01)
*B62K 3/02* (2006.01)

(52) U.S. Cl.
CPC ............... *B62K 15/00* (2013.01); *B60K 1/00* (2013.01); *B62K 3/02* (2013.01); *B62K 2015/001* (2013.01)

(58) Field of Classification Search
CPC . B62K 15/00; B62K 2015/001; B62K 15/006; B62K 3/02; B60K 1/00; B60K 2001/0405
(Continued)

(56) References Cited

U.S. PATENT DOCUMENTS

| 4,895,379 A | * | 1/1990 | Kelly | B62K 13/00 |
| | | | | 280/282 |
| 5,036,938 A | * | 8/1991 | Blount | B62D 61/08 |
| | | | | 180/208 |

(Continued)

FOREIGN PATENT DOCUMENTS

| CN | 2825435 Y | 10/2006 |
| CN | 2830123 Y | 10/2006 |

(Continued)

OTHER PUBLICATIONS

GB Search Report dated Oct. 17, 2016 (3 pages).

*Primary Examiner* — Hau Phan
*Assistant Examiner* — Jacob Meyer
(74) *Attorney, Agent, or Firm* — Frank A. McKenzie; Bejin Bieneman PLC

(57) ABSTRACT

A kit for an electric cycle includes a powertrain module including a case, a battery disposed in the case, an electric motor in communication with the battery and disposed in the case, and a connecting port on the case. The kit includes a first module including a frame member configured to releasably engage the connecting port and a wheel rotatably connected to the frame member, a second module including a frame member configured to releasably engage the connecting port, and a releasable locking feature on the connecting port.

16 Claims, 9 Drawing Sheets

(58) Field of Classification Search
USPC .......... 280/1.88, 7.1–7.17, 295–297, 30–32, 280/47.18; 180/208, 210
See application file for complete search history.

(56) References Cited

U.S. PATENT DOCUMENTS

| | | | |
|---|---|---|---|
| 5,277,267 A * | 1/1994 | Tiffany | B62D 61/08 180/208 |
| 5,456,481 A * | 10/1995 | Allsop | B29C 45/006 280/274 |
| 5,509,678 A * | 4/1996 | Ullman | B62K 3/005 280/281.1 |
| 6,170,592 B1 * | 1/2001 | Wu | B62D 21/12 180/208 |
| 6,378,642 B1 * | 4/2002 | Sutton | B62D 61/08 180/208 |
| 6,390,215 B1 * | 5/2002 | Kodama | B60K 1/04 180/2.1 |
| 6,691,813 B2 * | 2/2004 | Schless | B62K 11/02 180/220 |
| 6,725,955 B2 * | 4/2004 | Bidwell | B62M 7/16 180/11 |
| 6,726,523 B2 * | 4/2004 | Baker | A63H 11/10 180/181 |
| 6,739,421 B1 * | 5/2004 | Miya | B62K 15/006 180/206.1 |
| 6,886,845 B2 * | 5/2005 | Chao | B62K 15/00 280/278 |
| 6,896,084 B2 * | 5/2005 | Lo | A61G 5/045 180/208 |
| 6,929,277 B2 * | 8/2005 | Chao | B62K 15/00 280/278 |
| 6,979,013 B2 | 12/2005 | Chen | |
| 7,150,332 B2 * | 12/2006 | Edmonds, Jr. | B62M 6/60 180/315 |
| 7,178,108 B1 | 2/2007 | Workman et al. | |
| 7,234,557 B2 * | 6/2007 | Chen | B62K 5/025 180/208 |
| 7,458,876 B2 * | 12/2008 | Laurienzo | A63H 17/00 446/288 |
| 7,578,515 B2 * | 8/2009 | Appleman | B62K 15/00 280/278 |
| 7,794,300 B2 * | 9/2010 | Moll | A63H 33/003 446/164 |
| 7,934,576 B2 * | 5/2011 | Munksoe | B62K 11/00 180/220 |
| 7,988,174 B2 * | 8/2011 | Lee | B62K 15/00 280/278 |
| 8,152,189 B2 * | 4/2012 | Dodman | B62K 3/10 280/261 |
| 8,261,859 B2 * | 9/2012 | Duehring | B62M 7/14 180/11 |
| 8,297,384 B2 * | 10/2012 | Wanger | B62K 27/003 180/11 |
| 8,523,210 B1 | 9/2013 | Tung | |
| 8,556,284 B2 * | 10/2013 | Appleman | B62K 3/00 280/278 |
| 8,627,910 B1 * | 1/2014 | Carque | B62K 15/00 180/208 |
| 8,789,640 B2 * | 7/2014 | Matsuda | B62K 11/06 180/206.1 |
| 8,814,195 B2 * | 8/2014 | Beistegui Chirapozu | B62K 3/10 280/281.1 |
| 8,838,308 B2 * | 9/2014 | Meyers | B62J 17/00 174/53 |
| 8,857,550 B2 * | 10/2014 | Kim | B62K 3/10 180/206.2 |
| 8,864,207 B2 * | 10/2014 | Hixson | B60P 3/0257 296/22 |
| 8,915,324 B2 * | 12/2014 | Paick | B60W 10/08 180/219 |
| 8,979,110 B2 * | 3/2015 | Talavasek | B62M 6/90 280/279 |
| 8,991,529 B2 * | 3/2015 | Bryant | B62D 51/04 180/19.2 |
| 9,050,540 B1 * | 6/2015 | Norman | A63H 17/00 |
| 9,150,272 B1 * | 10/2015 | Thompson | B62K 15/008 |
| 9,248,880 B2 * | 2/2016 | Haimoff | B62K 3/02 |
| 9,284,007 B2 * | 3/2016 | Belenkov | B62B 15/003 |
| 9,290,229 B2 * | 3/2016 | Thompson | B62K 15/006 |
| 9,346,514 B2 * | 5/2016 | Thompson | B62K 15/008 |
| 9,359,036 B2 * | 6/2016 | Thompson | B62K 15/008 |
| 9,381,973 B2 * | 7/2016 | Williams | B62M 6/55 |
| 2003/0102176 A1 * | 6/2003 | Bautista | B60G 21/007 180/210 |
| 2005/0161898 A1 * | 7/2005 | Chao | B62K 19/06 280/278 |
| 2005/0252706 A1 * | 11/2005 | Thomas | B62M 6/45 180/206.2 |
| 2006/0260852 A1 * | 11/2006 | Wu | B62K 5/007 180/65.1 |
| 2007/0210540 A1 * | 9/2007 | Moll | A63H 33/003 280/30 |
| 2008/0135319 A1 * | 6/2008 | Lynn | B62K 15/00 180/208 |
| 2009/0095552 A1 * | 4/2009 | Gulas | B62M 6/45 180/206.5 |
| 2010/0117327 A1 * | 5/2010 | Hadley | B62M 6/90 280/214 |
| 2012/0103715 A1 * | 5/2012 | Deslippe | A63B 55/61 180/208 |
| 2012/0118657 A1 * | 5/2012 | Liao | A63B 55/61 180/208 |
| 2013/0062129 A1 * | 3/2013 | Sunami | B62K 3/10 180/65.1 |
| 2013/0257145 A1 * | 10/2013 | Caldeira | B60L 3/0046 307/9.1 |
| 2014/0061376 A1 * | 3/2014 | Fisher | B64D 27/24 244/62 |
| 2014/0203567 A1 * | 7/2014 | Lemus | H02K 7/1807 290/1 A |
| 2014/0274582 A1 * | 9/2014 | Simmons | A63B 69/16 482/57 |
| 2014/0374130 A1 * | 12/2014 | Nakamura | B25B 21/026 173/176 |
| 2015/0263592 A1 * | 9/2015 | Kawakami | H02K 9/06 310/50 |
| 2015/0375820 A1 * | 12/2015 | Banasky | B62M 6/60 280/287 |
| 2016/0031517 A1 * | 2/2016 | Neugebauer | B62J 99/00 180/207.3 |
| 2016/0031525 A1 * | 2/2016 | Craven | B62J 99/00 180/206.2 |
| 2016/0075225 A1 * | 3/2016 | Aich | B60K 7/0007 180/206.6 |
| 2016/0096574 A1 * | 4/2016 | Liu | B62K 5/027 180/214 |
| 2016/0096587 A1 * | 4/2016 | Bachman | B62M 6/70 180/220 |
| 2016/0251052 A1 * | 9/2016 | Perkins | B62K 15/00 |

FOREIGN PATENT DOCUMENTS

| | | |
|---|---|---|
| CN | 200981607 Y | 11/2007 |
| CN | 202243869 U | 5/2012 |
| CN | 103921878 A | 7/2014 |
| CN | 103979047 A | 8/2014 |
| CN | 204713348 U | 10/2015 |
| DE | 3837185 A1 | 5/1990 |
| EP | 2176117 B1 | 3/2011 |
| GB | 2232390 A | 12/1990 |
| GB | 2530155 A | 3/2016 |
| WO | 2015155352 A1 | 10/2015 |

\* cited by examiner

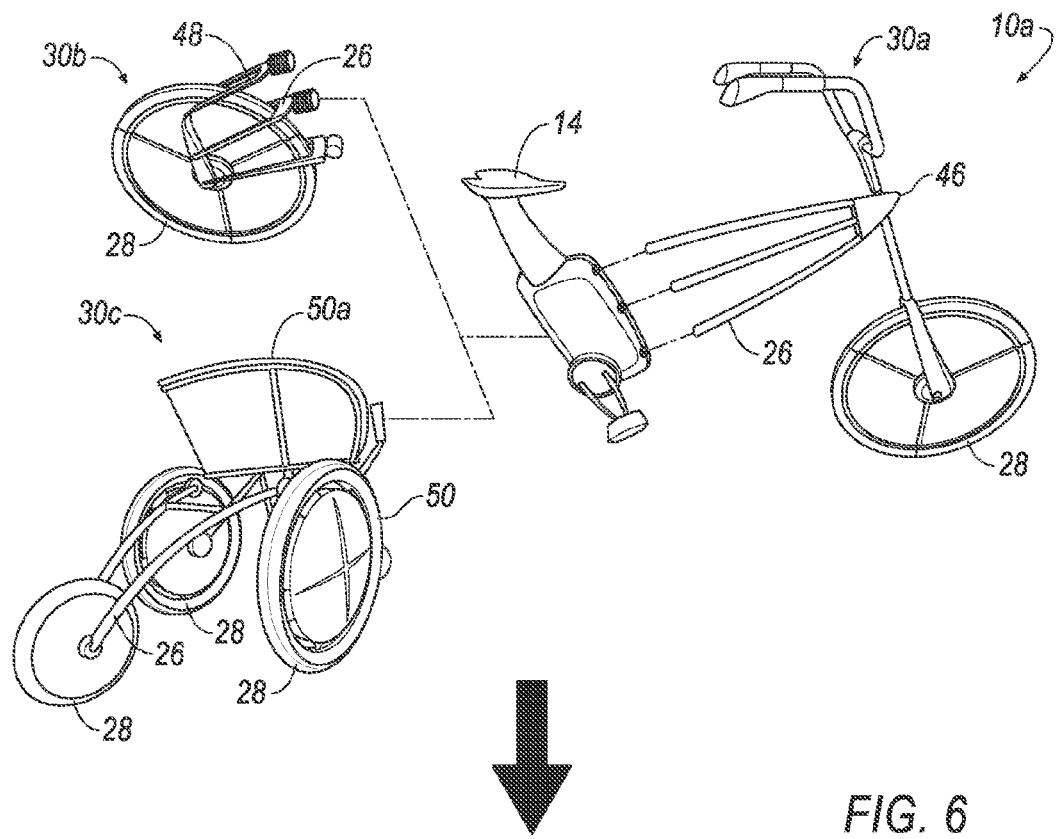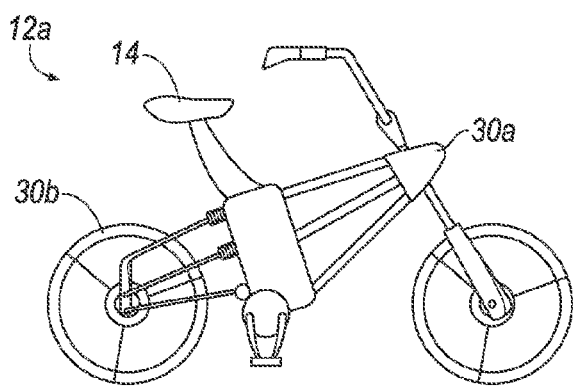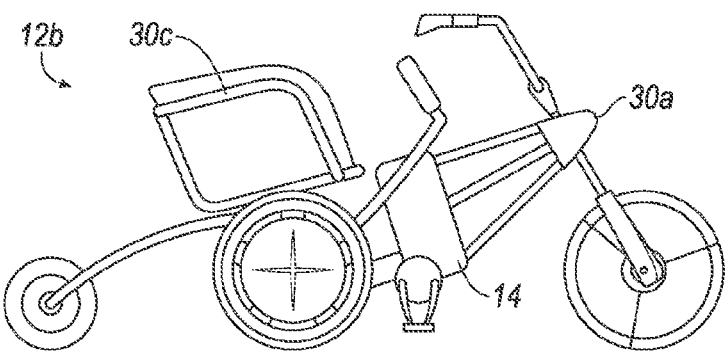
FIG. 6

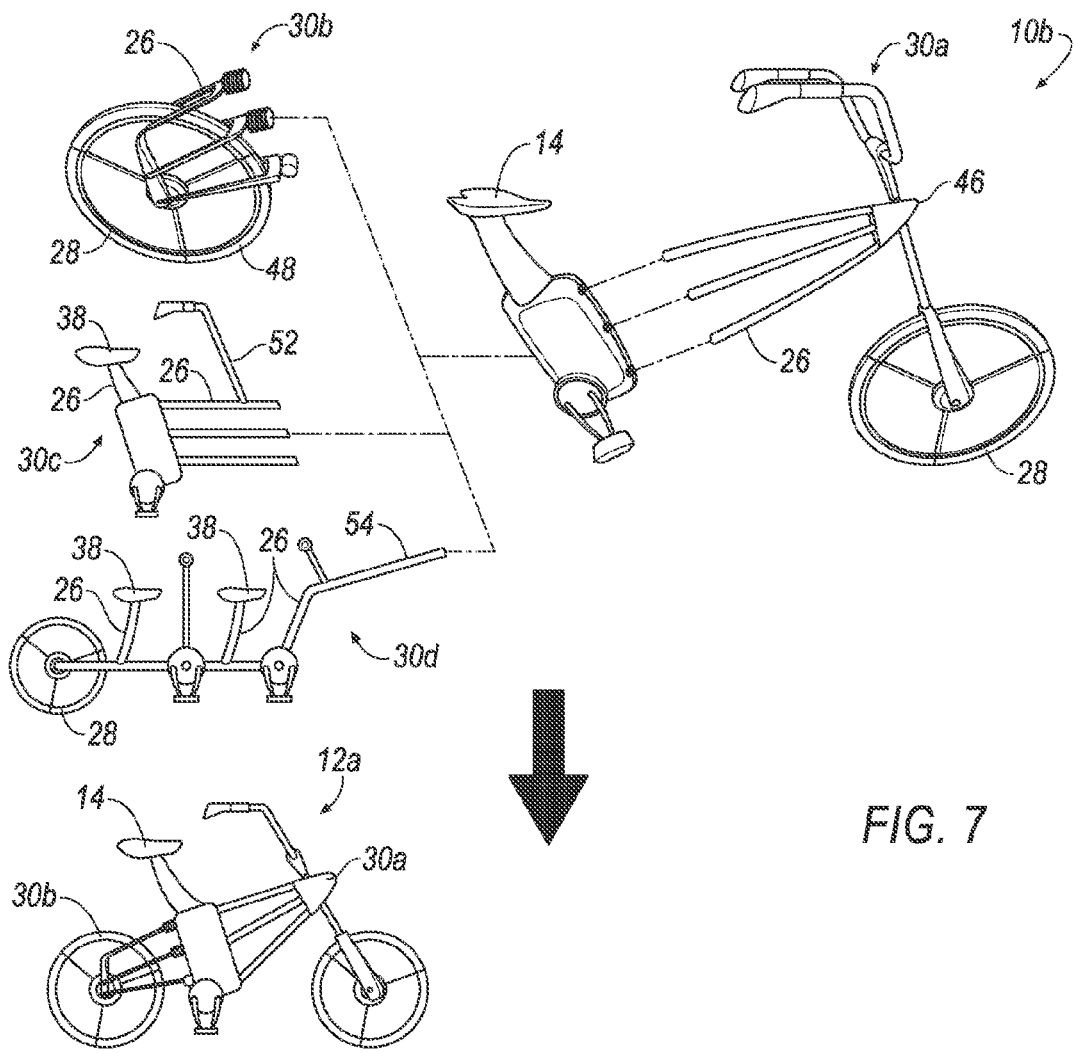
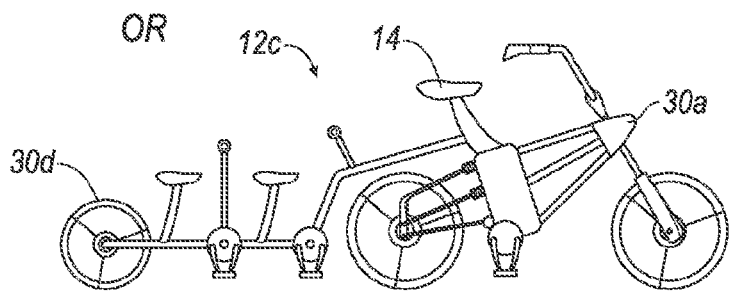
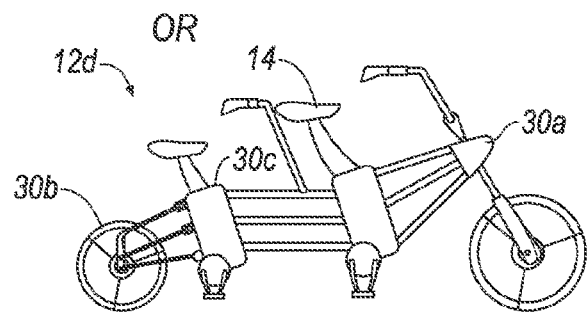
FIG. 7

ELECTRIC CYCLE

BACKGROUND

Electric cycles provide supplemental transportation options for vehicle consumers to suit needs that automobiles may not optimally provide. For example, a two-wheel electric cycle (i.e., an electric bicycle) may be used on smaller roads that larger passenger vehicles cannot easily use. The electric cycles are often transported with the vehicles for use at different destinations.

Different kinds of electric cycles may suit different consumer needs. For example, an electric wheelchair is suited for consumers who require mobile assistance, and an infant carrier is suited for consumers with small children. Because consumers may have different and changing requirements, access to a plurality of electric cycles is desired. Because each electric cycle consumes space, owning several electric cycles is often unwieldy. Furthermore, vehicles often have limited space to store the electric cycles.

There remains an opportunity to design electric cycles that can accommodate multiple consumer needs and satisfy packaging constraints in vehicles.

BRIEF DESCRIPTION OF THE DRAWINGS

FIG. 6 is a view of a first exemplary kit for the electric cycle.

FIG. 7 is a view of a second exemplary kit for the electric cycle.

DETAILED DESCRIPTION

Figure 1:
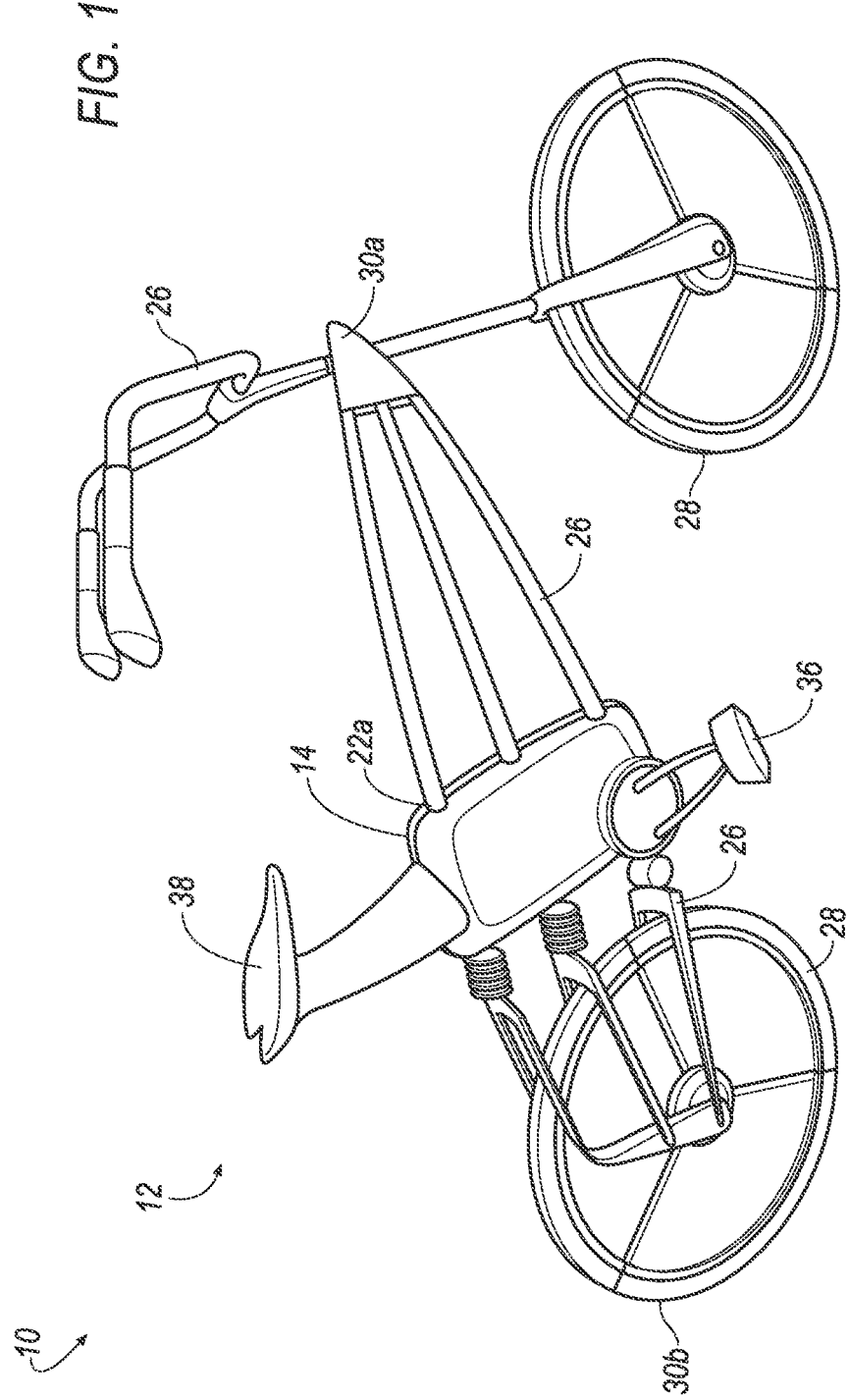
FIG. 1 is a side view of an electric cycle.

With reference to the Figures, wherein like numerals indicate like parts throughout the several views, a kit 10 for an electric cycle 12 includes a powertrain module 14, a first module 30a, and a second module 30b. The powertrain module 14 includes a case 16, a battery 18 disposed in the case 16, an electric motor 20 in communication with the battery 18 and disposed in the case 16, and a connecting port 22a, 22b, 22c, 22d, 22e, 22f on the case 16. A releasable locking feature 24 is on the connecting port 22a, 22b, 22c, 22d, 22e, 22f. The first module 30a includes a frame member 26 and a wheel 28 rotatably connected to the frame member 26. The frame member 26 is configured to releasably engage the connecting port 22a, 22b, 22c, 22d, 22e, 22f. The second module includes a frame member 26 configured to releasably engage the connecting port 22a, 22b, 22c, 22d, 22e, 22f.

The electric cycle 12 may be formed with either of the first or second modules 30a, 30b attached to the powertrain module 14, allowing for customization of the electric cycle 12. Thus, the kit 10 allows for a cyclist (not shown) to construct any one of a plurality of cycles 12 depending on the needs of the cyclist. Because the first and second modules 30a, 30b include frame members 26 configured to releasably engage the connecting port 22a, 22b, 22c, 22d, 22e, 22f, the first and second modules 30a, 30b may be attached, released, and swapped. The releasable locking feature 24 secures the first and second modules 30a, 30b to the powertrain module 14 during use of the electric cycle 12, but allows the cyclist to swap the first and second modules 30a, 30b for construction of a different configuration of the cycle 12.

As set forth further below, the kit 10 may include a plurality of the modules 30a, 30b, 30c, 30d. Specifically, as shown in FIGS. 6-9 merely for exemplary purposes, the kit 10 may include the first module 30a, the second module 30b, a third module 30c, and/or a fourth module 30d. The kit 10 may include any combination of two or more modules, such as modules 30a, 30b, 30c, 30d, or other suitable module not shown in the examples of FIGS. 6-9. In other words, modules 30a, 30b, 30c, and 30d are merely shown in the figures and referenced throughout this text for exemplary purposes. The modules may be selectively chosen to form any of a plurality configurations of the electric cycle 12.

Figure 2:
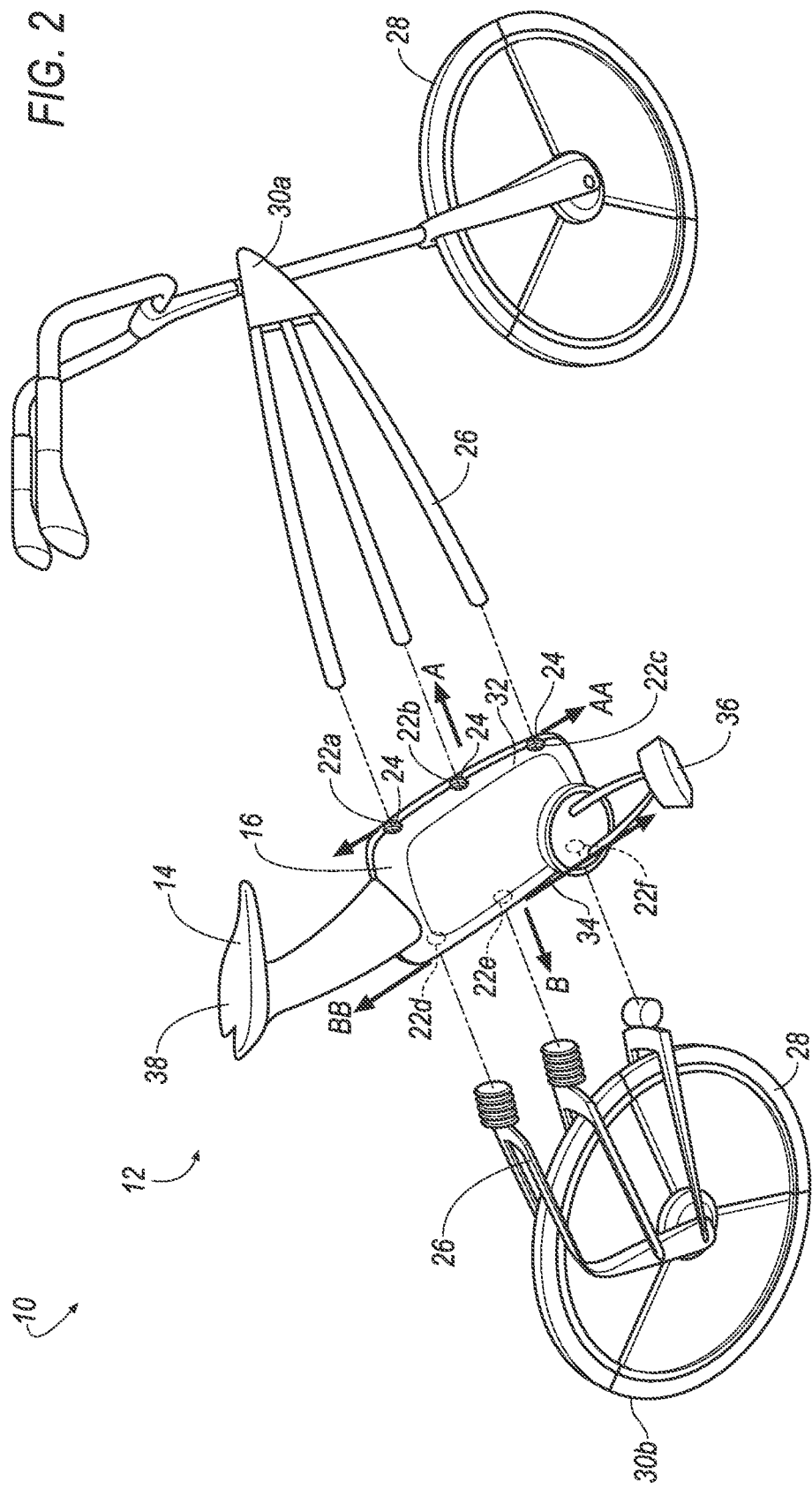
FIG. 2 is an exploded side view of the electric cycle.

The powertrain module 14 includes the case 16. As shown in FIG. 2, the case 16 may have a first side 32 and a second side 34 opposite the first side 32. The powertrain module 14 may include several connecting ports 22a, 22b, 22c, 22d, 22e, 22f, one of the connecting ports 22a being on the first side 32 and another connecting port 22d on the second side 34. The connecting ports 22a, 22b, 22c, 22d, 22e, 22f allow attachment of modules 30a, 30b, 30c, 30d to the first and second sides 32, 34. The first and second sides 32, 34 are positioned such that when the modules 30a, 30b, 30c, 30d are attached to the first and second sides 32, 34, the electric cycle 12 is properly aligned for use.

A set of pedals 36 may be supported by and extend through the case 16. The set of pedals 36 allows the cyclist to place their feet above the ground during use of the electric cycle 12 and may be pedaled by the cyclist to physically propel the electric cycle 12, as set forth further below. The set of pedals 36 may be constructed of any suitable material, e.g., a rigid polymer. The set of pedals 36 may rotate freely.

The powertrain module 14 may include a seat 38 supported on the case 16, as shown in FIGS. 1 and 2. The seat 38 may be constructed of any suitable material, e.g., a polymer. The seat 38 may be adjustable to accommodate the cyclist's height.

Figure 3:
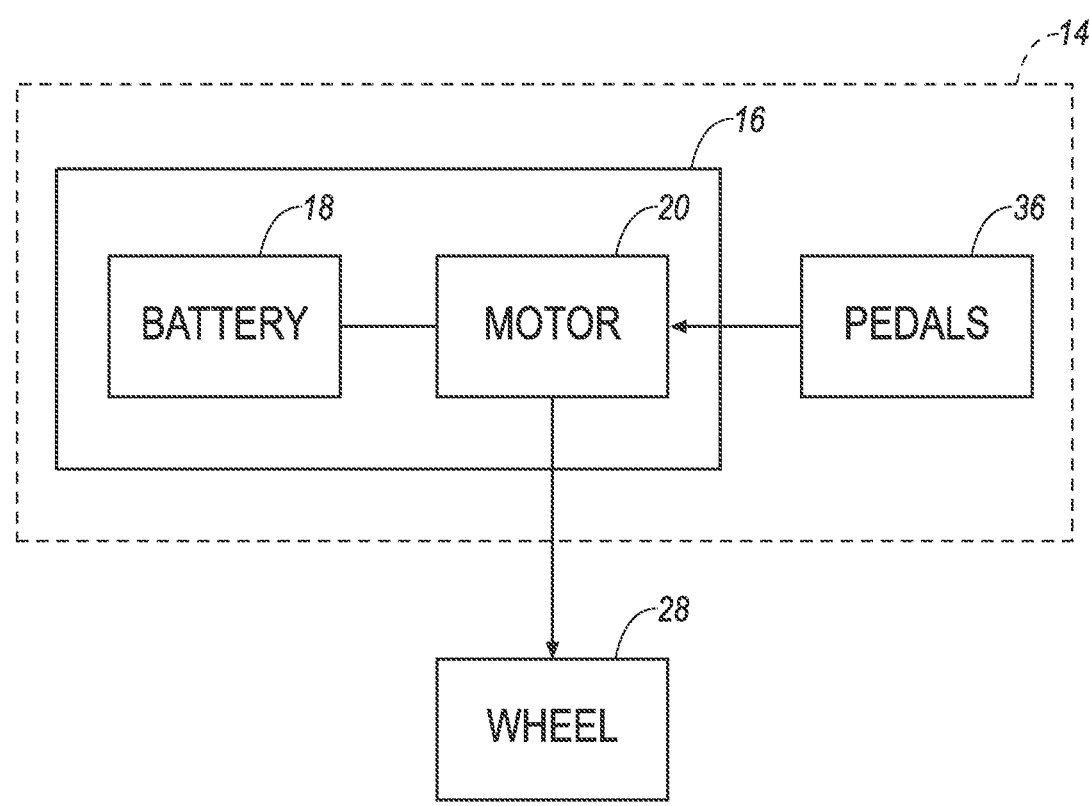
FIG. 3 is a block diagram of a powertrain module.

The powertrain module 14 may include the battery 18, as shown in FIG. 3. As mentioned before, the battery 18 may be disposed in the case 16. The battery 18 may be of any suitable type, e.g., lithium-ion, nickel-metal hydride, solid-state, etc.

The powertrain module 14 may include the electric motor 20, as shown in FIG. 3. The electric motor 20 may be disposed in the case 16. The electric motor 20 may be in communication with the battery 18, which provides electricity to operate the electric motor 20. The set of pedals 36 may be connected to the electric motor 20, and revolving the set of pedals 36 may rotate the electric motor 20 in such a manner as to recharge the battery 18.

The modules 30a, 30b, 30c, 30d may include one or several frame members 26. The frame members 26 may be constructed of any suitable material, e.g., aluminum. The frame members 26 may be configured to engage the connecting ports 22a, 22b, 22c, 22d, 22e, 22f. The frame members 26 may, e.g., connect the powertrain module 14 to the wheel 28, provide handlebars for the cyclist to steer the electric cycle 12, or connect to other frame members 26, etc.

Figure 5:
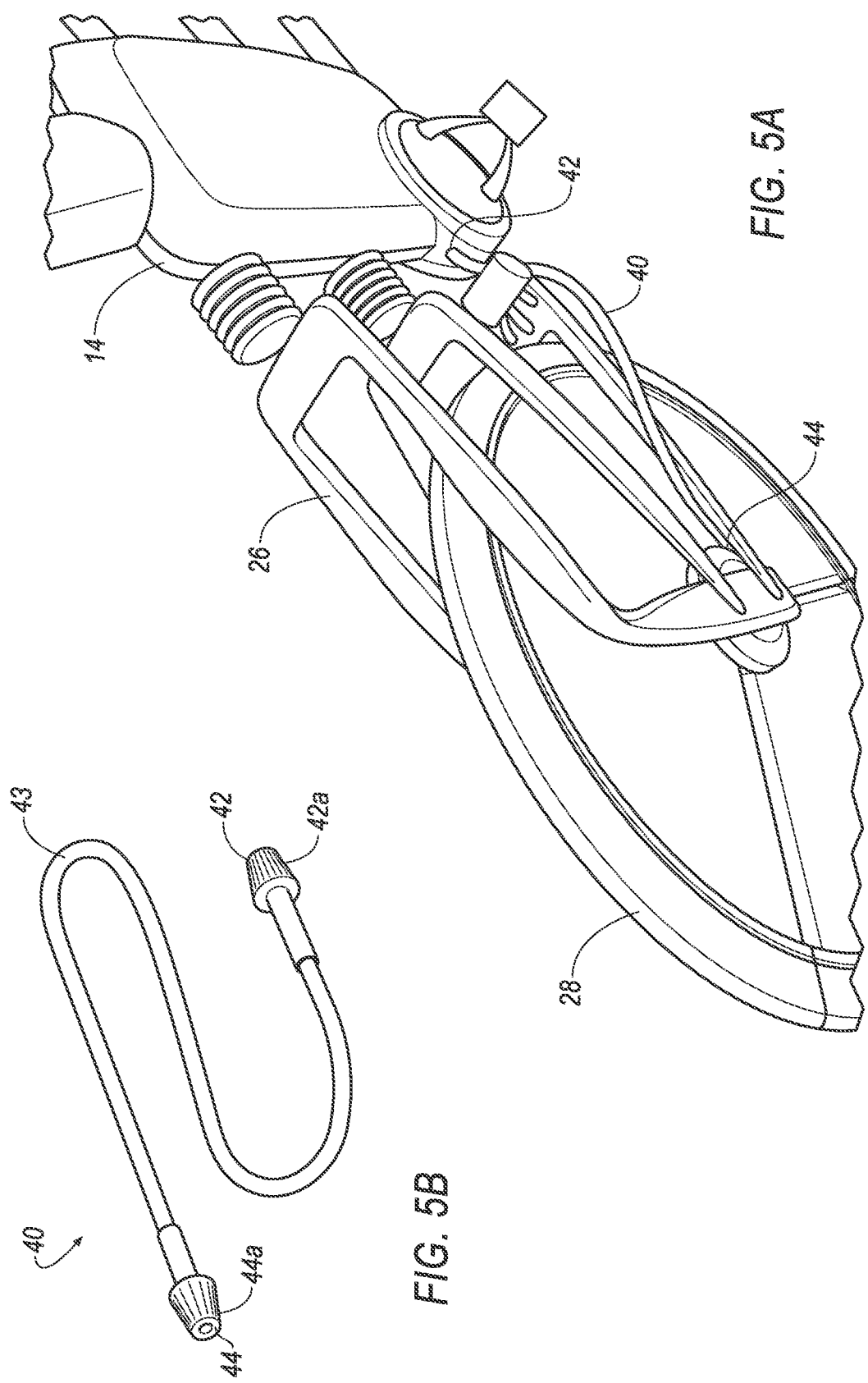
FIG. 5A is a perspective view of a transmission on the electric cycle.
FIG. 5B is a view of the transmission.

As shown in FIGS. 5A-5B, the kit 10 may include a transmission 40 having a first end 42 connected to the electric motor 20 and a second end 44 configured to be connected to one of the wheels 28. The first end 42 may be connected directly to the electric motor 20 or may be connected to the electric motor 20 through intermediate gearing (not shown). Similarly, the second end 44 may be connected directly to the wheel 28 or may be connected to the wheel 28 through intermediate gearing (not shown).

The transmission 40 may be connected to the set of pedals 36 such that pedaling the pedals 36 may transfer rotation through the transmission 40 to the wheel 28. The transmission 40 may be directly connected to the set of pedals 36 or may be connected to the set of pedals 36 through intermediate gearing (not shown). A freewheel (not shown) may be disposed between the set of pedals 36 and the wheel 28 such that the electric motor 20 may be operated without rotating the set of pedals 36.

The transmission 40 may be a flexible cable transmission, as shown in FIG. 5B. Specifically, the flexible cable transmission shown in FIG. 5B includes a gear 42*a* at the first end 42, a gear 44*a* at the second end 44, and a flexible cable (not shown) extending through a sheath 43 from between the gears 42*a*, 44*a*. Rotation of one of the gears 42*a*, 44*a* is transmitted by the flexible cable to the other of the gears 42*a*, 44*a*. Alternatively, the transmission 40 may be of any suitable type, e.g., a chain or belt transmission.

The transmission 40 may transfer rotation of the electric motor 20 to rotate the wheel 28, propelling the electric cycle 12. Specifically, as set forth above, the first end 42 of the transmission 40 is connected to the electric motor 20 and the second end 44 may be connected to the one of the wheels 28, and, when the electric motor 20 is powered, rotation is transmitted through the transmission 40 from the first end 42 to the second end 44, e.g., from gear 42*a* to gear 44*a* through the cable, to rotate the wheel 28. In addition, the transmission 40 may transfer rotation of the set of pedals 36 to rotate the wheel 28.

Figure 4:
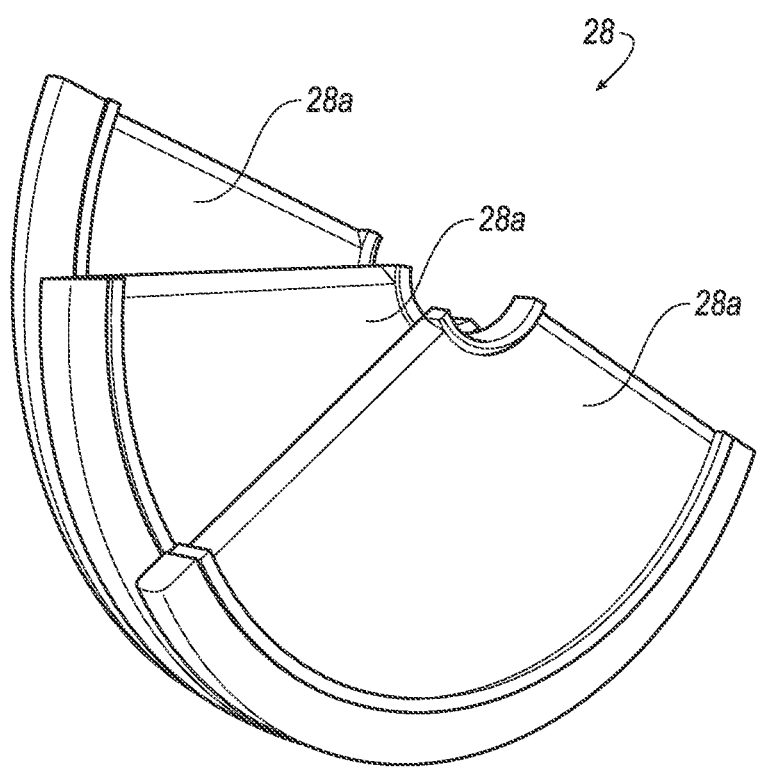
FIG. 4 is a perspective view of a wheel in a folded state.

At least one of the modules 30*a*, 30*b*, 30*c*, 30*d* may include one or several of the wheels 28. As shown in FIG. 4, the wheel 28 may include a plurality of sectors 28*a* pivotable from a folded state to an unfolded state. The sectors 28*a* may be pivoted into the folded state for, e.g., packaging constraints. When the wheel 28 is needed for use with one of the modules 30*a*, 30*b*, 30*c*, 30*d*, the wheel 28 may be pivoted to the unfolded state. The wheel 28 may then be attached to one of the modules 30*a*, 30*b*, 30*c*, 30*d* for use in one of the configurations of the electric cycle 12.

As mentioned above, the powertrain module 14 may include several connecting ports 22*a*, 22*b*, 22*c*, 22*d*, 22*e*, 22*f*. Specifically, as shown in FIGS. 1 and 2, the powertrain module may include a first connecting port 22*a*, a second connecting port 22*b*, a third connecting port 22*c*, a fourth connecting port 22*d*, a fifth connecting port 22*e*, and a sixth connecting port 22*f*. It should be appreciated that the powertrain module 14 may include any number of connecting ports, such as connecting ports 22*a*, 22*b*, 22*c*, 22*d*, 22*e*, 22*f*.

As shown in FIGS. 1 and 2, the first, second, and third connecting ports 22*a*, 22*b*, 22*c* may be disposed on the first side 32, and the fourth, fifth, and sixth connecting ports 22*d*, 22*e*, 22*f* may be disposed on the second side 34. The connecting ports 22*a*, 22*b*, 22*c* on the first side 32 may engage modules 30*a*, 30*b*, 30*c*, 30*d* configured to face the front of the electric cycle 12, and the connecting ports 22*d*, 22*e*, 22*f* on the second side 34 may engage modules 30*a*, 30*b*, 30*c*, 30*d* configured to face the rear of the electric cycle 12.

As shown in FIG. 2, the first, second, and third connecting ports 22*a*, 22*b*, 22*c* may face in a common direction A, and the fourth and fifth connecting ports 22*d*, 22*e* may face in a second common direction B. The second common direction B may be parallel with and substantially opposite the common direction A. The first, second, and third connecting ports 22*a*, 22*b*, 22*c* may be spaced from each other along an axis AA, and the fourth, fifth, and sixth connecting ports 22*d*, 22*e*, 22*f* may be spaced from each other along a second axis BB.

Each of the connecting ports 22*a*, 22*b*, 22*c*, 22*d*, 22*e*, 22*f* may include one of the releasable locking features 24. The releasable locking features 24 engage the frame members 26, locking the frame members 26 into place during operation of the electric cycle 12. The releasable locking features 24 allow the frame members 26 to be selectively released from the powertrain module 14, and the cyclist may exchange the modules 30*a*, 30*b*, 30*c*, 30*d* to form a different configuration of the electric cycle 12. The releasable locking feature 24 may be of any suitable construction, e.g., a releasable pin, a threaded attachment, a movable flange, a releasable tab, a tightened thread, etc., that locks the frame members 26 to the powertrain module 14 during operation of the electric cycle 12 while allowing the frame members 26 to be selectively released and exchanged to alter the configuration of the electric cycle 12.

Figure 8:
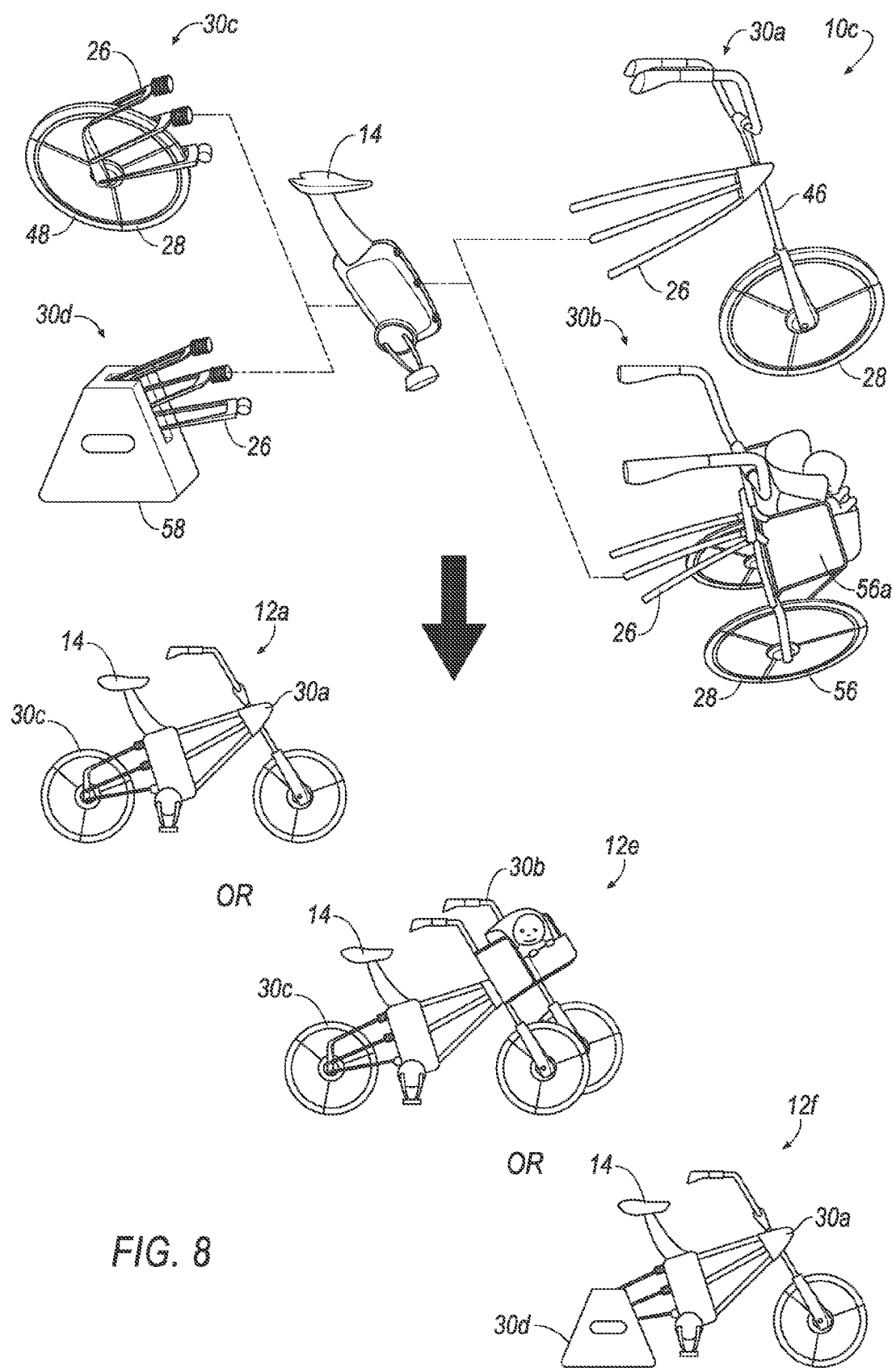
FIG. 8 is a view of a third exemplary kit for the electric cycle.
Figure 9:
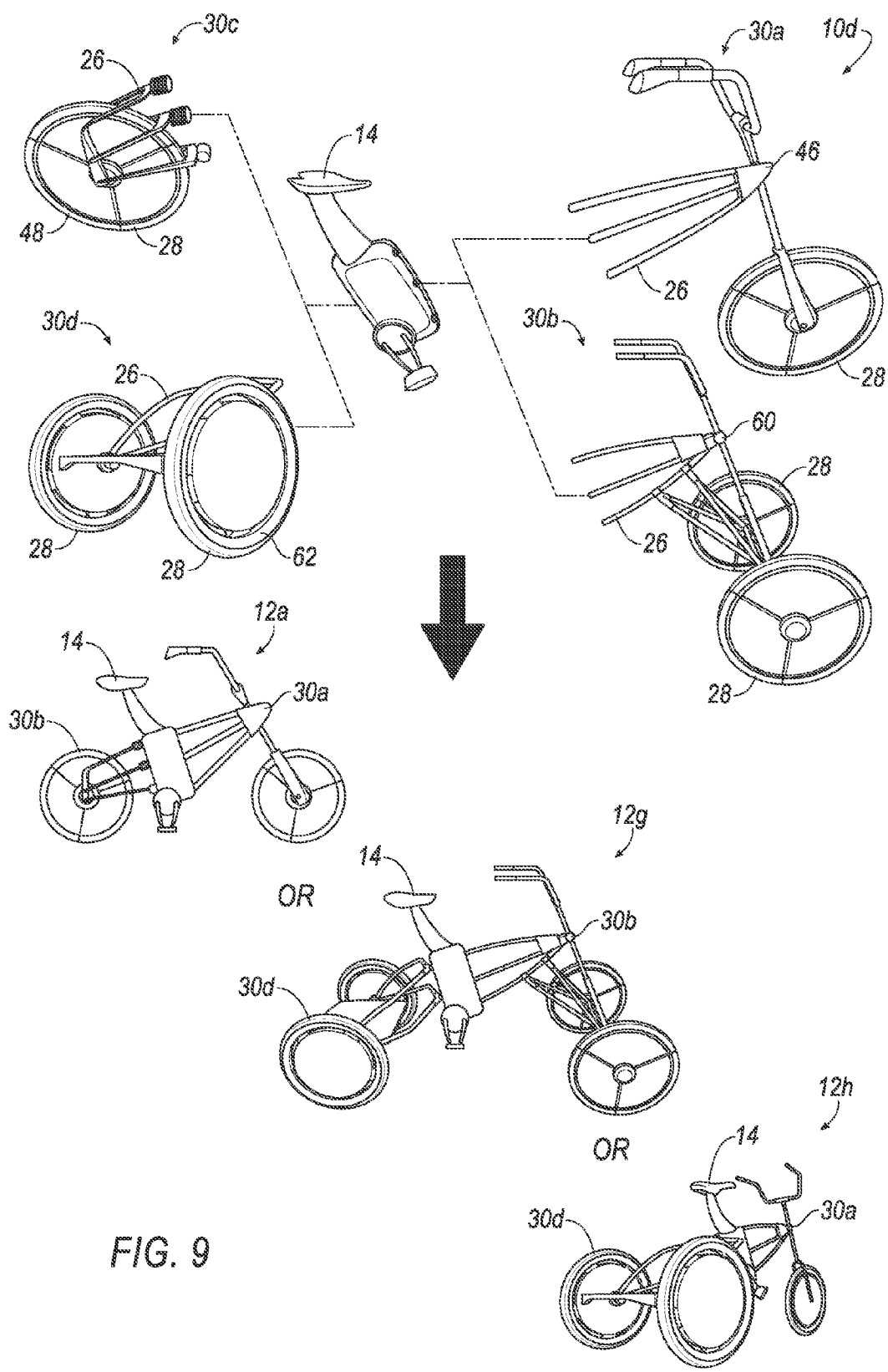
FIG. 9 is a view of a fourth exemplary kit for the electric cycle.

As set forth above, the modules 30*a*, 30*b*, 30*c*, 30*d* may be selectively connected to the case 16 to form any of a plurality configurations of the electric cycle 12. Each of the modules 30*a*, 30*b*, 30*c*, 30*d* includes the frame member 26 configured to releasably engage the connecting ports 22*a*, 22*b*, 22*c*, 22*d*, 22*e*, 22*f*. As shown in FIGS. 8 and 9, the first module 30*a* and the second module 30*b* may be configured to engage the first side 32 of the case 16. Having multiple modules 30*a*, 30*b*, 30*c*, 30*d* in the kit 10 that may engage the first side 32 of the case 16 allows for several different configurations of the electric cycle 12. Depending on the cyclist's current needs, the modules 30*a*, 30*b*, 30*c*, 30*d* may be swapped to form the configuration of the electric cycle 12 more suited to the cyclist.

As shown in FIGS. 6-9, the third module 30*c* and the fourth module 30*d* may be configured to engage the second side 34 of the case 16. In conjunction with the first and second modules 30*a*, 30*b* engaging the first side 32 of the case 16, several different configurations of the electric cycle 12 may be formed.

The modules 30*a*, 30*b*, 30*c*, 30*d* may take any of several forms, as shown in exemplary kits 10*a*, 10*b*, 10*c*, 10*d* of FIGS. 6-9. Any of the modules 30*a*, 30*b*, 30*c*, 30*d* shown in the exemplary kits 10 of FIGS. 6-9 may be combined to create a customized kit 10 for any exemplary configuration of the electric cycle 12.

As shown in FIG. 6, the kit 10*a* may include a single wheel steering module 46, a single wheel rear module 48, and a wheelchair attachment 50. Here, the first module 30*a* is the single wheel steering module 46 configured to engage the first side 32 of the case 16. The first module 30*a* includes several frame members 26. The first module 30*a* further includes one of the wheels 28. The second module 30*b* is the single wheel rear module 48. The second module 30*b* includes another wheel 28 and frame members 26 connecting the wheel 28 to the second side 34 of the case 16. The first and second modules 30*a*, 30*b* may engage the powertrain module 14 to form an electric bicycle 12*a*.

The third module 30*c* may be the wheelchair attachment 50. The wheelchair attachment 50 includes three wheels 28, a seat 50*a*, and frame members 26 connecting the seat 50*a* and the wheels 28 to the powertrain module 14. The first and third modules 30*a*, 30*c* may engage the powertrain module 14 to form an electric wheelchair 12*b*. The third module 30*c* may solely engage the powertrain module 14 to form a compact electric wheelchair (not shown).

FIG. 7 shows the kit 10b with a tandem-seat module 52 and a multi-person module 54. Here, the first module 30a may be the single wheel steering module 46, the second module 30b may be the single wheel rear module 48, the third module 30c may be the tandem-seat module 52, and the fourth module 30d may be the multi-seat module 54. The first module 30a is configured to engage the first side 32 of the case 16 and the second, third, and fourth modules 30b, 30c, 30d are configured to engage the second side 34 of the case 16.

The tandem seat module 52 includes another seat 38 supported by frame members 26 and another set of pedals 36. To form a tandem bicycle 12d, the third module 30c may engage the second module 30b and the powertrain module 14. Specifically, the third module 30c may include frame members 26 that engage the connecting ports 22d, 22e, 22f on the second side 34 of the case 16. The second module 30b may then engage the third module 30c, forming the tandem electric bicycle 12d.

As shown by the tandem bicycle 12d, the modules 30a, 30b, 30c, 30d may engage each other in addition to engaging the powertrain module 14. Specifically, the tandem bicycle 12d includes the three modules 30a, 30b, and 30c, with the third module 30c engaging both the powertrain module 14 and the second module 30b.

The multi-seat module 54 may include a plurality of seats 38, a wheel 28, a plurality of sets of pedals 36, and several frame members 26 to connect the wheel 28 to the seats 54a, to support the seats 38, and to engage the powertrain module 14. The fourth module 30d may engage the powertrain module 14 and/or the second module 30b to form a multi-seat cycle 12c. Specifically, one of the frame members 26 may engage the powertrain module 14 directly, or may engage the second module 30b (not shown).

FIG. 8 shows the kit 10c with an infant seat module 56 and a stationary module 58. Here, the first module 30a may be the single wheel steering module 46, the second module 30b may be the infant seat module 56, the third module 30c may be the single wheel rear module 48, and the fourth module 30d may be the stationary module 58.

The infant seat module 56 may include an infant seat 56a, a plurality of wheels 28, and a plurality of frame members 26 to connect the infant seat 56a and the wheels 28. The stationary module 58 may be a non-circular stand that includes a plurality of frame members 26. The first and second modules 30a, 30b are configured to engage the first side 32 of the case 16, and the third and fourth modules 30c, 30d are configured to engage the second side 34 of the case 16.

The first and third modules 30a, 30c may engage the powertrain module 14 to form the electric bicycle 12a. The second and third modules 30b, 30c may engage the powertrain module 14 to form an electric infant carrier 12e. The first and fourth modules 30a, 30d may engage the powertrain module 14 to form a stationary electric cycle 12f. Rotation of the set of pedals 36 of the stationary electric cycle 12f may recharge the battery 18 while remaining stationary.

FIG. 9 shows the kit 10d with a multi-wheel steering module 60 and a multi-wheel rear module 62. The multi-wheel steering module 60 includes two wheels 28 and a plurality of frame members 26. The multi-wheel rear module 62 includes two wheels 28 and a plurality of frame members 26.

Here, as shown in FIG. 9, the first module 30a may be the single wheel steering module 46, the second module 30b may be the multi-wheel steering module 60, the third module 30c may be the single wheel rear module 48, and the fourth module 30d may be the multi-wheel rear module 62. The first and second modules 30a, 30b are configured to engage the first side 32 of the case 16 while the third and fourth modules 30c, 30d are configured to engage the second side 34 of the case 16.

The first and third modules 30a, 30c may engage the powertrain module 14 to form the electric bicycle 12a. The first and fourth modules 30a, 30d may engage the powertrain module 14 to form an electric tricycle with two rear wheels 12h; the second and third modules 30b, 30c may engage the powertrain module 14 to form an electric cycle with two front wheels (not shown). The second and fourth modules 30b, 30d may engage the powertrain module 14 to form an electric quadricycle 12g.

The kit 10 may be transported in an automobile (not shown). For example, the kit 10, including two or more of the modules 30a, 30b, 30c, 30d may be disassembled and transported in a storage compartment of the automobile, e.g., a hatch, trunk, cargo space, etc. Since the modules 30a, 30b, 30c, 30d may be releasably engaged with the connecting ports 22a, 22b, 22c, 22d, 22e, 22f, the modules 30a, 30b, 30c, 30d may be disassembled from the case 16 to reduce occupied storage. The cyclist may drive the automobile to a desired location and, depending on the desire of the cyclist, the cyclist may assemble any of the modules 30a, 30b, 30c, 30d to the case 16 for a desired use at that location.

Each of the modules 30a, 30b, 30c, 30d may be disassembled with an appropriate tool, e.g., a hex key, a screwdriver, a set of tweezers, etc., to form different modules. The modules 30a, 30b, 30c, 30d may also be disassembled to conserve space in the automobile.

The modules including modules 30a, 30b, 30c, 30d, or any other suitable module, may manufactured in any suitable manner, e.g., 3-dimensional printing. For example, the modules or parts of modules, including frame members 26, may be formed by 3-dimensional printing to form modules suitable to various tasks. These 3-dimensionally printed modules may include frame member 26 configured to engage the releasable locking feature 24 and may be added to the kit 10 with the modules 30a, 30b, 30c, 30d.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A kit for a reconfigurable electric cycle comprising:
a powertrain module including a case, a battery disposed in the case, an electric motor in communication with the battery and disposed in the case, and a connecting port on the case;
a first module including a frame member of the cycle configured to releasably engage the connecting port and a wheel rotatably connected to the frame member;
a second module including a frame member of the cycle configured to releasably engage the connecting port; and
a releasable locking feature on the connecting port.

2. The kit of claim 1, wherein the powertrain module includes a second connecting port disposed on the case.

3. The kit of claim 2, wherein the first and second connecting ports face in a common direction and are spaced from each other along a vertical axis.

4. The kit of claim 2, wherein the powertrain module includes a third connecting port facing in a common direction, with the first, second, and third connecting ports spaced from each other along an axis.

5. The kit of claim 1, further comprising a transmission having a first end connected to the electric motor and a second end configured to be connected to the wheel of the first module.

6. The kit of claim 5, wherein the transmission is a flexible cable transmission.

7. The kit of claim 1, wherein the second module further includes a wheel rotatably connected to the frame member of the second module.

8. The kit of claim 1, further comprising an opposite connecting port positioned on the case opposite the connecting port, a third module including a frame member configured to releasably engage the opposite connecting port and a wheel rotatably connected to the frame member of the third module, and a second releasable locking feature on the opposite connecting port.

9. The kit of claim 8, wherein the second module is configured to releasably engage at least one of the first module and the third module.

10. The kit of claim 9, wherein the second module further includes a seat supported by the frame member of the second module and a set of pedals rotatably connected to the frame member of the second module.

11. The kit of claim 8, further comprising a fourth module including a frame member configured to releasably engage at least one of the connecting port, the second connecting port, the first module, the second module, and the third module.

12. The kit of claim 1, wherein the first module includes an infant seat disposed above the wheel.

13. The kit of claim 1, wherein the first module includes a seat supported by the frame member of the first module.

14. The kit of claim 1, wherein the powertrain module includes a seat supported on the case.

15. The kit of claim 1, wherein the wheel comprises a plurality of sectors pivotable from a folded state to an unfolded state.

16. The kit of claim 1, wherein the second module is configured to releasably engage the first module.

* * * * *